(12) United States Patent
Hays et al.

(10) Patent No.: US 10,576,616 B2
(45) Date of Patent: Mar. 3, 2020

(54) POWER TOOL WIRE FORM HOOK ASSEMBLY

(71) Applicant: Black & Decker Inc., New Britain, CT (US)

(72) Inventors: James D. Hays, Bel Air, MD (US); John C. Wenig, Bel Air, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/973,004

(22) Filed: May 7, 2018

(65) Prior Publication Data
US 2019/0337142 A1 Nov. 7, 2019

(51) Int. Cl.
*B25C 7/00* (2006.01)
*B25H 3/00* (2006.01)
*B25F 5/02* (2006.01)
*F16B 45/00* (2006.01)

(52) U.S. Cl.
CPC ............ *B25H 3/006* (2013.01); *B25F 5/02* (2013.01); *F16B 45/00* (2013.01); *B25C 7/00* (2013.01)

(58) Field of Classification Search
CPC ... B25C 7/00; B25H 3/006; B25F 5/02; A45F 2005/028; Y10S 224/904
See application file for complete search history.

(56) References Cited

U.S. PATENT DOCUMENTS 4,784,308 A   11/1988  Novak et al.
4,936,499 A *  6/1990  Gulley ...................... A45F 5/02
                                                     206/364
5,337,635 A    8/1994  Habermehl
5,469,767 A   11/1995  Habermehl
5,699,704 A   12/1997  Habermehl
6,422,447 B1   7/2002  White et al.
6,488,195 B2  12/2002  White et al.
6,499,643 B1  12/2002  Hewitt
6,612,476 B2   9/2003  Smolinski
6,672,498 B2   1/2004  White et al.
6,708,821 B2   3/2004  Tucker et al.

(Continued)

FOREIGN PATENT DOCUMENTS

DE      202009001797 U1    7/2010

OTHER PUBLICATIONS

Extended European Search Report dated Oct. 2, 2019 in European Patent Application No. 19172371.7.

*Primary Examiner* — Bradley Duckworth
(74) *Attorney, Agent, or Firm* — Harness, Dickey & Pierce, P.L.C.

(57) ABSTRACT

A power tool housing can include a circumferential housing groove having at least one detent. A wire can include a central bend forming a hook end of a wire body, and can include two free ends of the wire forming a coupling end of the wire body. The coupling end can be received in the housing groove, and the coupling end can have at least one cooperating detent. The at least one detent and the at least one cooperating detent can be engaged in a storage position in which the hook end is positionable adjacent the power tool housing, and can be engaged in an in-use position in which the hook end is positionable extending away from the power tool housing ready for use in hanging the tool. The coupling end can be slidable along the housing groove between the storage and in-use positions.

24 Claims, 6 Drawing Sheets

(56) References Cited

U.S. PATENT DOCUMENTS

| | | | |
|---|---|---|---|
| 6,763,991 B2 | 7/2004 | Hamano | |
| 6,808,101 B2 | 10/2004 | Laubach et al. | |
| 6,892,922 B2 | 5/2005 | Tucker et al. | |
| 7,306,052 B2 | 12/2007 | Vahabi-Nejad et al. | |
| 7,318,487 B2 | 1/2008 | Liao | |
| 7,565,989 B2 | 7/2009 | Lai et al. | |
| 7,922,054 B2 | 4/2011 | Cole, Jr. | |
| 7,942,299 B2 | 5/2011 | Steinbrunner et al. | |
| 8,167,056 B2 * | 5/2012 | Ito | B25H 3/006 173/171 |
| 8,308,034 B2 * | 11/2012 | Shibata | B25F 5/02 224/255 |
| 8,752,744 B2 | 6/2014 | Okouchi et al. | |
| 8,960,635 B2 | 2/2015 | Brendel et al. | |
| 8,998,057 B2 | 4/2015 | Gathers | |
| 9,522,464 B2 * | 12/2016 | Segura | B25F 5/02 |
| 9,707,693 B2 * | 7/2017 | Lee | B27B 9/00 |
| 9,889,547 B2 * | 2/2018 | Marks | B25C 7/00 |
| 2003/0146262 A1 | 8/2003 | Hwang et al. | |
| 2006/0070761 A1 | 4/2006 | Vahabi-Nejad et al. | |
| 2007/0080278 A1 | 4/2007 | Wen | |
| 2009/0025515 A1 | 1/2009 | Shibata et al. | |
| 2009/0134191 A1 * | 5/2009 | Phillips | A45F 5/02 224/269 |
| 2009/0277939 A1 | 11/2009 | Ou | |
| 2014/0097217 A1 * | 4/2014 | Walsh | A45F 5/021 224/268 |
| 2014/0097326 A1 | 4/2014 | Brendel et al. | |
| 2014/0298664 A1 * | 10/2014 | Van Bijsterveldt | B25F 5/02 30/298.4 |
| 2016/0128455 A1 | 5/2016 | Moreau et al. | |
| 2017/0225309 A1 * | 8/2017 | Meyer | B25C 1/008 |
| 2017/0259422 A1 * | 9/2017 | Takeyama | B25F 5/029 |
| 2018/0132600 A1 * | 5/2018 | Moreau | B25F 5/02 |
| 2018/0279752 A1 * | 10/2018 | Woodhams | A45F 5/021 |

\* cited by examiner

POWER TOOL WIRE FORM HOOK ASSEMBLY

FIELD

The present disclosure relates to a power tool hook assembly for hanging the power tool in which a hook end is movable between a storage position and an in-use position.

BACKGROUND

This section provides background information related to the present disclosure which is not necessarily prior art.

Power tool hook assemblies having hook ends that are moveable between a storage position and an in-use position can often be comprised of relatively large numbers of components in order to achieve all of the desired functionality. These components must be manufactured, inventoried and assembled together, resulting in increased costs to manufacture the power tool. In addition, such power tool hook assemblies can often only be completed when the components are assembled together with the remainder of the power tool. For example, a housing groove supporting a power tool hook can in some cases only be formed when a portion of the power tool hook assembly carrying one circumferential edge wall of the groove is joined to another portion of the power tool carrying the opposing circumferential edge groove. This means the assembly of the power tool hook assembly must occur on the manufacturing line with the remainder of the tool, rather than being able to be pre-assembled into an independent unit off-line. Such in-line assembly can also lead to increased manufacturing costs.

SUMMARY

This section provides a general summary of the disclosure, and is not a comprehensive disclosure of its full scope or all of its features.

In accordance with one aspect of the present disclosure, a power tool wire form hook assembly for hanging the power tool can include a power tool housing including a housing groove extending circumferentially around a portion of the power tool and having at least one detent. A wire can include a central bend forming a hook end of a wire body, and can include two free ends of the wire forming a coupling end of the wire body. The coupling end can be received in the housing groove, and the coupling end can have at least one cooperating detent. The at least one detent and the at least one cooperating detent can be engaged in a storage position in which the hook end is positionable adjacent the power tool housing, and can be engaged in an in-use position in which the hook end is positionable extending away from the power tool housing ready for use in hanging the tool. The coupling end can be slidable along the housing groove between the storage and in-use positions.

In accordance with another aspect of the present disclosure, a power tool wire form hook assembly for hanging the power tool can include a power tool housing including a first housing component and a second, annular housing component. The second, annular housing component can include a housing groove extending circumferentially around the second, annular housing component. The second, annular housing component can be a single-piece housing component including opposing circumferential edge walls of a housing groove and the housing groove can have four detents. A wire can include a central bend forming a hook end of a wire body, and can include two free ends of the wire forming a coupling end of the wire body. The coupling end can be received in the housing groove, and the coupling end can have four cooperating detents. The four detents and the four cooperating detents can be engaged in a storage position in which the hook end is positionable adjacent the power tool housing, and can be engaged in an in-use position in which the hook end is positionable extending away from the power tool housing ready for use in hanging the tool. The coupling end can be slidable along the housing groove between the storage and in-use positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
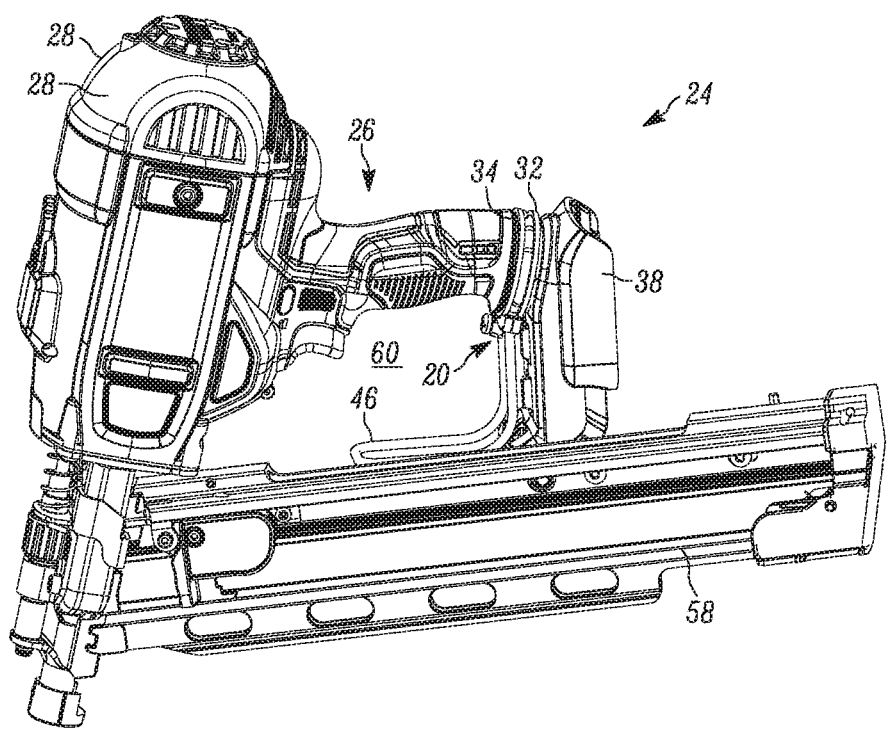
FIG. 1 is a perspective view of an exemplary power tool, including one example of a power tool wire form hook assembly in accordance with the present disclosure.
Figure 2:
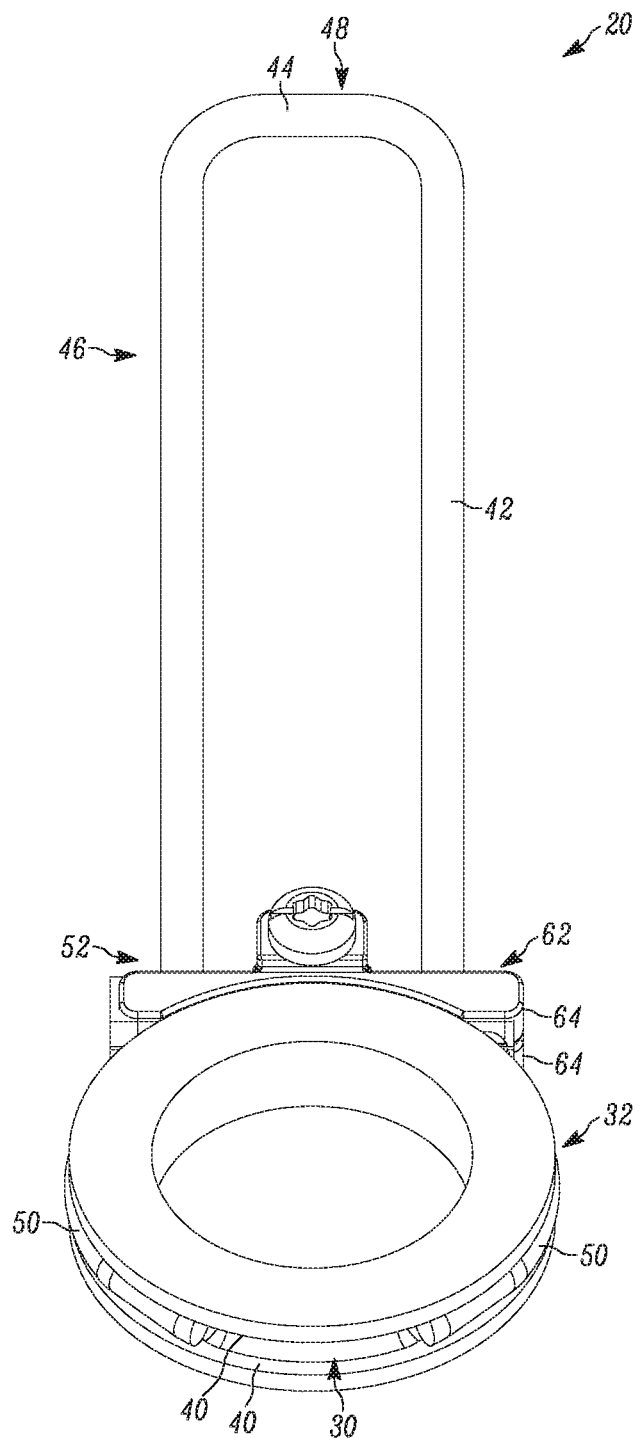
FIG. 2 is a perspective view of the example power tool wire form hook assembly of FIG. 1.
Figure 3:
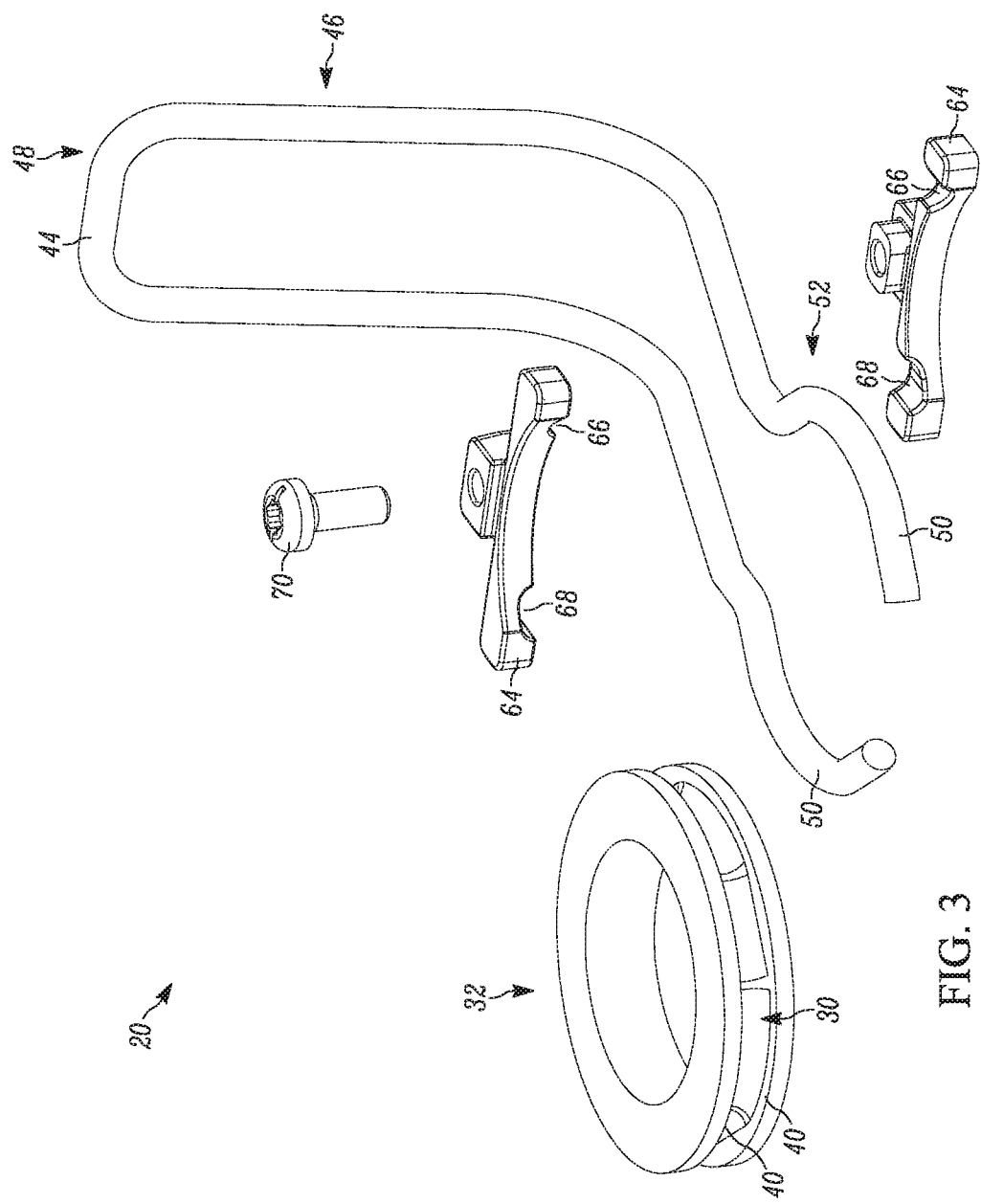
FIG. 3 is an exploded view of the example power tool wire form hook assembly of FIG. 1.
Figure 4:
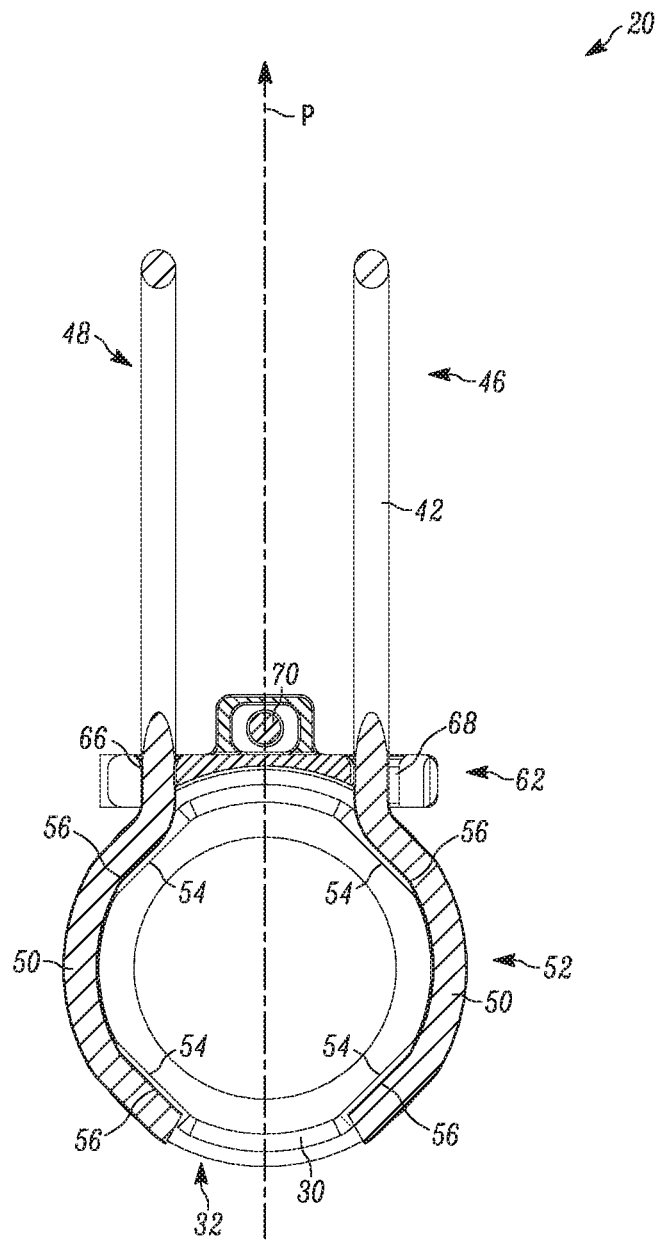
FIG. 4 is a cross-section view of the example power tool wire form hook assembly of FIG. 1, with the hook end in a storage position.

Example embodiments will now be described more fully with reference to the accompanying drawings.

FIGS. 1-6 illustrate one example of a power tool wire hook assembly 20 for hanging the power tool 24 in accordance with the present disclosure. As examples, a cordless electric stapler or nail gun, such as the framing nailer power tool 24 of FIG. 1, can include the power tool wire hook assembly 20. The power tool 24 can include a housing 26. For example, the housing 26 of the power tool 24 can include two clamshell housing halves 28, a magazine housing 58, and a battery coupling housing 38.

The housing 26 of the power tool 24 can additionally include a housing groove 30 that can extend circumferentially around a portion of the power tool 24. As in the illustrated example, the housing groove 30 can be provided by a housing component 32 that is separate from the clamshell halves 28 of the housing 26. The housing component 32 can be mounted at a base 34 of a handle 36 of the power tool 24. The annular housing 32 can be mounted between the handle 36 and a battery receptacle or coupling housing 38.

The separate housing component 32 can be a single-piece housing component 32 and can have an overall annular shape. As with this example housing component 32, a single-piece housing 32 can include both opposing edge walls 40 of the housing groove 30. In this case, the single-piece housing component 32 can include both of the opposing side walls 40 throughout the entire circumference of the housing groove 30. Similarly, when the housing groove 30 is integrally formed by clamshell housing halves 28, each of the clamshell halves 28 can provide a single-piece housing component that can include both opposing edge walls 40 of the housing groove 30. In this case, each single-piece clamshell half 28 can provide a single-piece housing component 28 that can include both opposing edge walls 40 of each radial half of the housing groove 30.

In both cases, there is no need to split the housing groove 30 in a transverse direction; and therefore, the edge walls 40 of the housing groove 30 that oppose each other can be provided by a single-piece component. In the clamshell housing halves 28 example, no additional components are required to fully form the housing groove 30 beyond the clamshell housing halves 28 themselves. In the single-piece annular housing component example, the power tool wire form hook assembly can be formed as an independent assembled unit. Each of these can minimize the number of parts required for the assembly 20, can simplify manufacturing and assembly, or both.

A wire 42 can include a central bend 44 that can form a distal hook end 46 of a wire body 48. The wire 42 can also include two proximal free ends 50 that together form a coupling end 52 of the wire body 48. The coupling end 52 of the wire can be received in, and slidable around or along, the housing groove 30. The groove 30 can have at least one detent 54, and the coupling end 52 of the wire 42 or wire body 48 can have at least one cooperating detent 56.

The example detents 54 of the groove 30 can be provided as flats along the circumference of the groove 30 and the cooperating detents 56 of the wire 42 can be provided as cooperating flats along the coupling end 52 of the wire 42. The detents 54 and cooperating detents 56 can combine to total at least three. For example, the groove 30 can be provided with four detents 54 and the coupling end 52 of the wire 42 can be provided with four corresponding detents 56; combining to total eight.

The detents 54 of the groove 30 and the cooperating detents 56 of the wire 42 can be selectively engaged with each other to position and retain the hook end 46 in a storage position in which the hook end 46 is adjacent the power tool housing 26. For example, as illustrated in FIG. 1, the hook end 46 can be positioned in alignment with the primary central plane (indicated by "P" in the figures) of the power tool 24, and can extend alongside the magazine housing 58 in the storage position. In addition, the hook end 46 can be located in the storage position within a central opening or window 60 of the housing 26 of the power tool 24. This window 60 can be defined by clamshell housing halves 28 including the handle 36, the battery mount housing 38, and the magazine housing 58.

The detents 54 of the groove 30 and the cooperating detents 56 of the wire 42 can be selectively engaged with each other to position and retain the hook end 46 in an in-use position in which the hook end 46 extends away from the power tool housing 26 ready for use in hanging the tool. For example, the wire body 48 can be rotated 90 degrees from the storage position (FIGS. 1 and 4), into an in-use position (FIG. 6) so that the hook end 46 is located on the right side of the tool 24, and is spaced or extends away from the housing 26 of the power tool 24. As another example, the wire body 48 can be rotated an additional 90 degrees (180 degrees total) into another in-use position in which the hook end 46 is located behind the tool and is spaced or extends away from the rear of the tool 24 along the tool plane P. As yet another example, the wire body 48 can be rotated again an additional 90 degrees (270 degrees total or 90 degrees in the opposite direction from the storage position) into another in-use position in which the hook end 46 is located on the left side of the tool 24, and is spaced or extends away from the housing 26 of the power tool 24.

Figure 5:
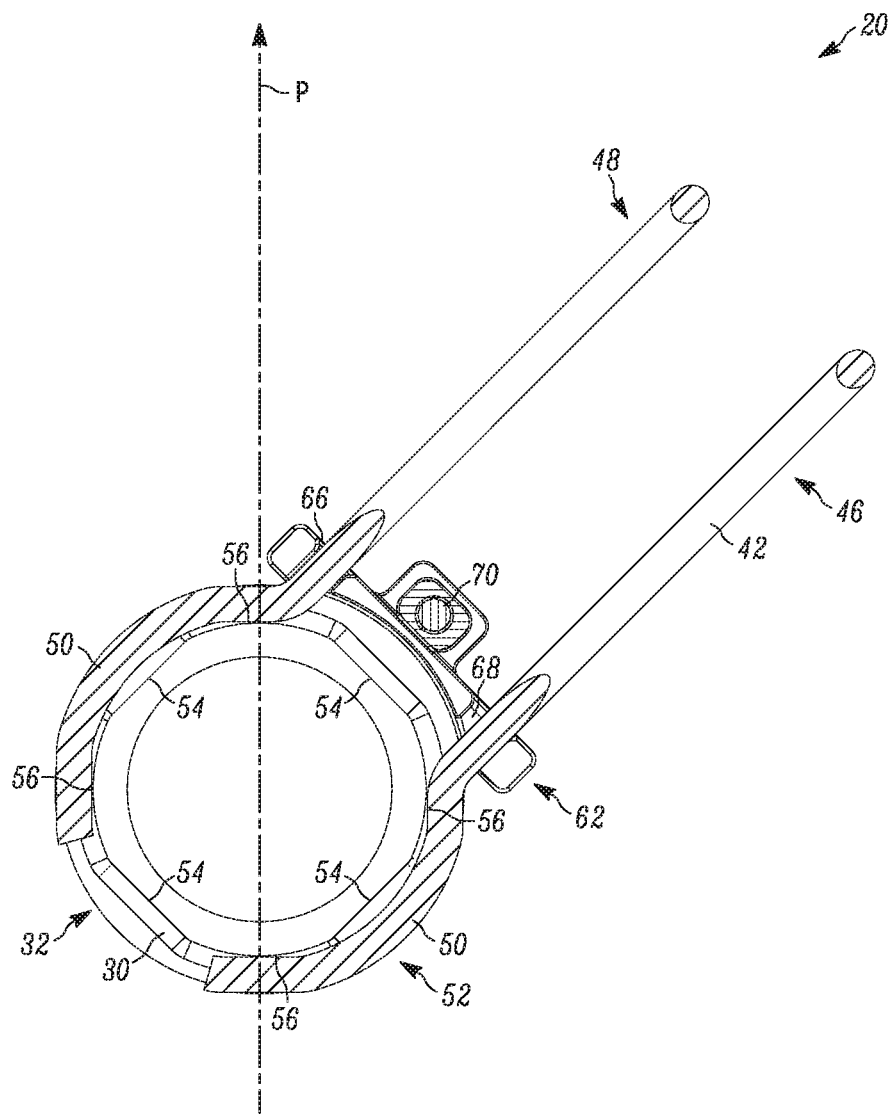
FIG. 5 is a cross-section view of the example power tool wire form hook assembly of FIG. 1, with the hook end in transition between the storage position of FIG. 4 and the in-use position of FIG. 6.
Figure 6:
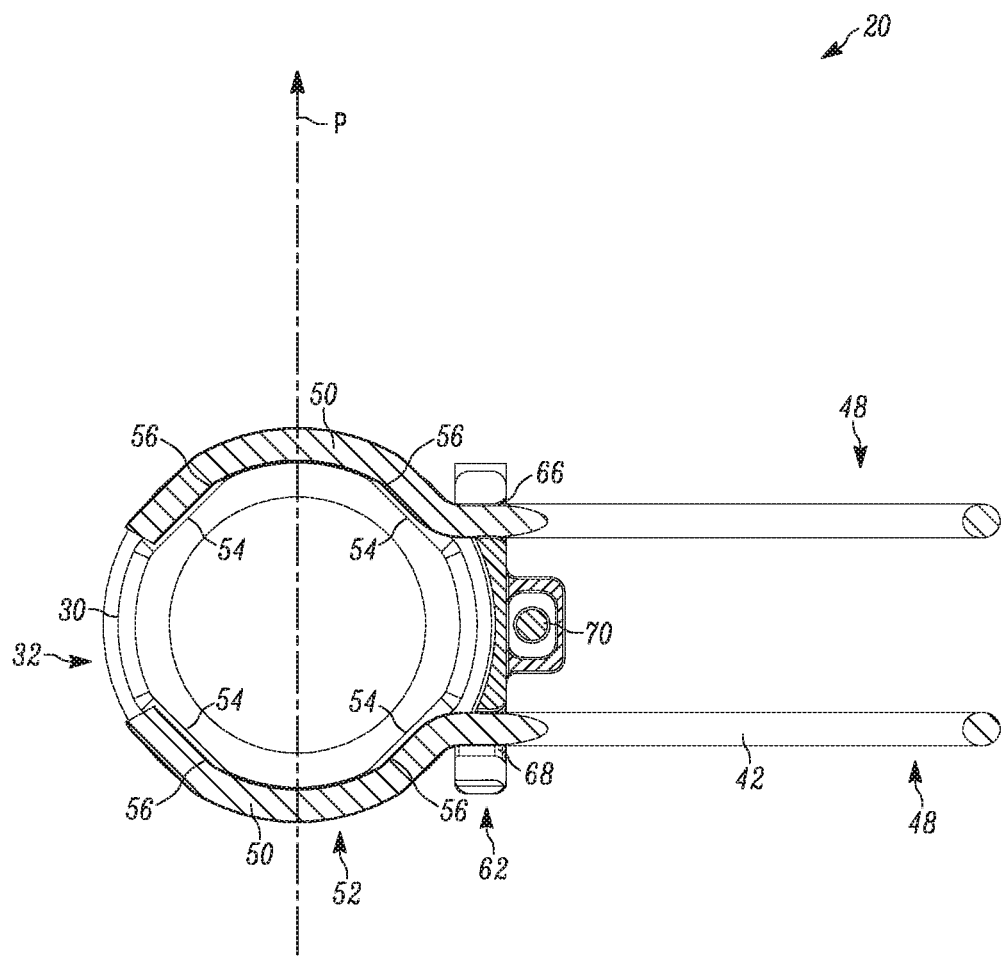
FIG. 6 is a cross-section view of the example power tool wire form hook assembly of FIG. 1, with the hook end in an in-use position.

In any of the positions noted above, the detents 54 and cooperating detents 56 are selectively engaged with each other to help retain the wire body 48 in the selected position. The two free ends 50 of the coupling end 52 of the wire 42 can be arranged to engage opposite radial sides of the housing groove 30. The wire 42 can be made of spring steel and the two free ends 50 of the coupling end of the wire 42 can be biased toward each other to facilitate cooperation of the detents 54, 56. Rotating the wire body 48 between any of the positions in which the detents 54 and cooperating detents 56 are selectively engaged with each other can cause the coupling end 52 to slide along the housing groove 30 (FIG. 5). Such rotation of the wire body 48 can also disengage the detents 54 and the cooperating detents 56 from each other and can increase the distance between the two free ends 50 of the wire 42 at the coupling end 52.

A wire limiter 62 can be provided to engage and prevent the two free ends 50 of the wire 42 at the coupling end 52 from moving away from each other sufficiently to escape the housing groove 30. The wire limiter 62 can be formed of two components 64, such as the exemplified upper and lower components, that can be coupled together via a threaded fastener 70 around the two free ends 50 of the wire 42. The two free ends 50 can extend through the wire limiter 62. A first of the two free ends 50 of the wire 42 can extend through a first aperture 66 of the wire limiter 62 and a second of the two free ends 50 can extend through a second aperture 68 of the wire limiter 62. The first aperture 66 can have a circular shape and the second aperture 68 can have an elongated or slotted shape. The wire limiter 62 can permit sufficient increase in the distance between the free ends 50 of the wire 42 at the coupling end 52 to permit disengagement of the detents from each other, but prevent this distance from increasing to an extent that the free ends 50 of the wire 42 at the coupling end 52 could escape the groove 30.

As noted above, the housing 26 of the power tool 24 can include a number of housing components or portions, including the clamshell halves 28, the battery coupling housing 38, and the magazine housing 58. The annular housing 32 can be a separate component or part from all of these other housing components. The annular housing 32 can be a single-piece component that can fully define the entirety of the housing groove 30. The annular housing 32, the wire 42 forming the hook end 46 and the coupling end 52 of the wire body 48, and the wire limiter 62 can all be couplable together to form the wire form hook assembly 20 as an independent assembled unit that is separate from the other housing components. This independent assembled unit or assembly 20 can be coupled to the one or more of the other housing components. For example, the wire form hook assembly 20 can be coupled between the clamshell halves 28 and the battery coupling housing 38.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool wire form hook assembly for hanging the power tool comprising:
a power tool housing including a housing groove extending circumferentially around a portion of the power tool and having at least one detent;
a wire including a central bend forming a hook end of a wire body, and two free ends of the wire forming a coupling end of the wire body, the coupling end being received in the housing groove, and the coupling end having at least one cooperating detent;
wherein the at least one detent and the at least one cooperating detent are engageable in a storage position in which the hook end is positionable adjacent the power tool housing, and are engageable in an in-use position in which the hook end is positionable extending away from the power tool housing ready for use in hanging the tool, and wherein the coupling end is slidable along the housing groove between the storage and in-use positions.

2. The power tool wire form hook assembly of claim 1, wherein the power tool housing is a single-piece housing component comprising opposing circumferential edge walls of the housing groove.

3. The power tool wire form hook assembly of claim 2, wherein the power tool housing is a single-piece housing component comprising opposing circumferential edge walls of the housing groove throughout the entire length of the housing groove.

4. The power tool wire form hook assembly of claim 1, wherein the power tool housing including the housing groove has an annular shape.

5. The power tool wire form hook assembly of claim 1, wherein each of the detents comprises a flat provided in the housing groove, and wherein each of the cooperating detents comprises a cooperating flat provided on the coupling end.

6. The power tool wire form hook assembly of claim 1, wherein the at least one detent of the housing groove comprises at least two detents.

7. The power tool wire form hook assembly of claim 1, wherein the at least one detent of the housing groove comprises at least four detents, and the at least one cooperating detent of the coupling end comprises at least two cooperating detents.

8. The power tool wire form hook assembly of claim 1, wherein the at least one detent of the housing groove comprises at least four detents, and the at least one cooperating detent of the coupling end of the wire comprises at least four cooperating detents.

9. The power tool wire form hook assembly of claim 1, wherein the two free ends of the wire of the coupling end are arranged to engage opposite radial sides of the housing groove.

10. The power tool wire form hook assembly of claim 9, wherein the two free ends of the wire of the coupling end are biased toward each other, and wherein disengagement of the detents and the cooperating detents increases the distance between the two free ends of the wire at the coupling end.

11. The power tool wire form hook assembly of claim 1, further comprising a wire limiter engaging and preventing the two free ends of the wire from moving away from each other sufficiently to escape the housing groove.

12. The power tool wire form hook assembly of claim 11, wherein the wire limiter comprises two halves coupled together around the two free ends of the wire.

13. The power tool wire form hook assembly of claim 11, wherein the two free ends of the wire extend through the wire limiter.

14. The power tool wire form hook assembly of claim 13, wherein a first of the two free ends of the wire extends through a first aperture of the wire limiter and a second of the two free ends extends through a second aperture of the wire limiter.

15. The power tool wire form hook assembly of claim 14, wherein the first aperture has a circular shape and the second aperture has an elongated shape.

16. The power tool wire form hook assembly of claim 11, wherein the power tool housing includes a first housing component and a second housing component, and the second housing component including the housing groove, and wherein the second housing component, the wire forming the hook end and the coupling end, and the wire limiter are couplable together to form an independent assembled unit that is separate from the first housing component, and the independent assembled unit being couplable to the first housing component to form the wire form hook assembly.

17. A power tool wire form hook assembly for hanging the power tool comprising:
a power tool housing including a first housing component and a second, annular housing component, and the second, annular housing component comprising a single-piece housing component including a housing groove extending circumferentially around the second, annular housing component with the housing groove having four detents and opposing circumferential edge walls of the housing groove;
a wire including a central bend forming a hook end of a wire body, and two free ends of the wire forming a coupling end of the wire body, the coupling end being received in the housing groove, and the coupling end having four cooperating detents;
wherein the four detents and the four cooperating detents are engageable in a storage position in which the hook end is positionable adjacent the power tool housing, and are engageable in an in-use position in which the hook end is positionable extending away from the tool housing ready for use in hanging the tool, and wherein the coupling end is slidable along the housing groove between the storage and in-use positions.

18. The power tool wire form hook assembly of claim 17, wherein each of the detents comprises a flat provided in the housing groove, and wherein each of the cooperating detents comprises a cooperating flat provided on the wire of the coupling end.

19. The power tool wire form hook assembly of claim 17, further comprising a wire limiter engaging and preventing the two free ends of the wire from moving away from each other sufficiently to escape the housing groove.

20. The power tool wire form hook assembly of claim 19, wherein the wire limiter comprises two halves coupled together around the two free ends of the wire.

21. The power tool wire form hook assembly of claim 19, wherein the two free ends of the wire extend through the wire limiter.

22. The power tool wire form hook assembly of claim 21, wherein a first of the two free ends of the wire extends through a first aperture of the wire limiter and a second of the two free ends extends through a second aperture of the wire limiter.

23. The power tool wire form hook assembly of claim 22, wherein the first aperture has a circular shape and the second aperture has an elongated shape.

24. The power tool wire form hook assembly of claim 19, wherein the second housing component including the housing groove, the wire forming a hook end and the coupling end, and the wire limiter are couplable together to form an independent assembled unit that is separate from the first housing component, and the independent assembled unit being couplable to the first housing component to form the wire form hook assembly.

* * * * *